United States Patent [19]

Hempenius et al.

[11] 3,876,806
[45] Apr. 8, 1975

[54] PROCESS FOR THE PREPARATION OF ACID SOLUBLE POLYPEPTIDES AND CARBONATED BEVERAGES CONTAINING SAME

[75] Inventors: Walter L. Hempenius, Cary; Chandler, Keith L., Barrington, both of Ill.

[73] Assignee: The Quaker Oats Company, Barrington, Ill.

[22] Filed: July 11, 1973

[21] Appl. No.: 378,225

Related U.S. Application Data

[63] Continuation-in-part of Ser. No. 189,255, Oct. 14, 1971, abandoned.

[52] U.S. Cl. .................... 426/46; 426/18; 426/44; 426/190
[51] Int. Cl. .......................... A23j 3/00; A23l 1/00
[58] Field of Search .......................... 426/18, 44, 46

[56] References Cited
UNITED STATES PATENTS

| 3,640,725 | 2/1972 | Sherba et al. | 426/46 |
| 3,645,745 | 2/1972 | Magnino et al. | 426/364 |
| 3,694,221 | 9/1972 | Hoer et al. | 426/46 |
| 3,733,207 | 5/1973 | McCabe | 426/46 X |
| 3,741,771 | 6/1973 | Pour-el et al. | 426/46 |

Primary Examiner—James R. Hoffman
Attorney, Agent, or Firm—Morton, Bernard, Brown, Roberts & Sutherland

[57] ABSTRACT

A process for preparing an acid-soluble polypeptide product for use as a base in preparing acidic, soft drink (e.g. carbonated), protein beverages, comprising the steps of
1. heating an aqueous slurry of defatted soya, corn or cotton seed protein to a temperature of about 150° to 375°F.,
2. controlling the temperature of the heat-treated slurry to provide temperature conditions for enzymatic hydrolysis,
3. subjecting the resulting slurry to enzymatic hydrolysis conditions, including the action of a proteolytic enzyme to produce water-soluble polypeptides,
4. adjusting the pH of the resulting slurry to in the range of from about 2.5 to about 6.0, preferably about 3.0 to 4.3, and
5. removing undissolved solids from the acidified slurry, thus yielding a mother liquor containing dissolved polypeptide product, is improved by evaporating from the mother liquor, prior to formulating it into a beverage, substantially all of those ingredients therein which boil below the boiling point of water, the evaporation being effected at a low enough temperature and over a short enough period of time not to effect substantial degradation of the polypeptide matter in the mother liquor.

30 Claims, No Drawings

PROCESS FOR THE PREPARATION OF ACID SOLUBLE POLYPEPTIDES AND CARBONATED BEVERAGES CONTAINING SAME

This application is a continuation-in-part of copending application Ser. No. 189,255, filed Oct. 14, 1971 and now subsequently abandoned.

BACKGROUND OF THE INVENTION

1. Field of the Invention

This invention relates to a process for preparing an acid-soluble polypeptide product from defatted protein derived from soya, corn or cotton seeds, which product is suitable for use as a base from which acidic, soft drink (e.g. carbonated), protein beverages can be prepared.

2. Description of the Prior Art

The need for an economical source of protein which is easily prepared and which readily appeals to human taste is well known. Because of this need, protein-containing beverages have been formulated using economical protein sources such as, for example, soya protein, casein and the like. A "neutral" beverage (one having a pH approximately neutrality) has been prepared simply by dissolving finely divided, protein-containing material, typically soya protein, in water and adding a suitable flavoring material. While such a beverage can be high in nutritional value, its taste and its general consistency, especially as it relates to mouth feel, do not give it the acceptability of acidified beverages generally, and, in particular, do not give it the acceptability of soft drink (e.g. carbonated) beverages.

It would seem that a neutral beverage containing protein in solubilized form could be easily converted to an acidified beverage simply by addition of suitable acid. However, such addition in the case of a protein beverage causes precipitation of a substantial portion of the protein. The precipitated material not only causes the beverage to appear cloudy, but imparts a gritty mouth feel to the product and a bitter taste. Such a product has very little appeal even to the most unsophisticated consumer. The precipitated protein, of course, can be removed from the beverage, such as by filtration, but such removal deprives the drinker of a substantial portion of the nutritional protein. In addition, even with removal of precipitated protein, the gritty mouth feel, bitter taste, and generally poor consistency of the product remain.

In copending U.S. patent application Ser. No. 165,338, filed July 22, 1971 by Hempenius, Moser, and Valenti, there is disclosed a process of preparing an acidified protein beverage which has the elusive combination of high polypeptide content, good mouth feel, and fairly good taste. This process involves subjecting an aqueous slurry of defatted soya, corn or cotton seed protein to a pre-hydrolysis, denaturation heat treatment, then to the hydrolytic action of a proteolytic enzyme to solubilize the protein, adjusting the pH of the thus treated aqueous slurry to in the range of from about 2.5 to about 6.0, advantageously from about 3.0 to about 4.0 or 4.3, and removing undissolved solids from the slurry to leave a mother liquor which can be formulated into a carbonated beverage.

SUMMARY OF THE INVENTION

It is an object of the present invention to provide an improvement in the preparation of a nutritional polypeptide-containing beverage by the process of application Ser. No. 165,338. More particularly, it is an object of the present invention to provide an improvement in such a process whereby the taste of the beverage will be more acceptable.

Other objects and advantages of the present invention will be apparent from the specification and appended claims.

The present invention resides in the discovery that if the dissolved polypeptide-containing mother liquor obtained according to the process described above, prior to being formulated into a beverage, is treated so as to evaporate therefrom substantially all of those ingredients which boil below the boiling point of water, then the taste of the mother liquor and any beverage prepared therefrom will be substantially improved.

The process of converting the protein to a nutritional polypeptide product comprises the steps of 1. heating an aqueous slurry of the defatted soya, corn or cottonseed protein at a temperature of about 150° to 375°F. for a time sufficient to increase the yield of a soluble, nutritional, polypeptide product which is produced when the heated slurry is subsequently subjected to enzymatic hydrolysis, but insufficient to deleteriously affect the flavor of said polypeptide product,
2. controlling the temperature of the heattreated slurry to provide temperature conditions for enzymatic hydrolysis,
3. subjecting the resulting slurry to enzymatic hydrolysis conditions, including the action of a proteolytic enzyme, to produce water-soluble polypeptides,
4. adjusting the pH of the resulting slurry to within the range of about 2.5 to about 6.0, advantageously from about 3.0 to about 4.3,
5. removing undissolved solids from the slurry to leave an acidic mother liquor containing dissolved polypeptides, and 6. evaporating from the mother liquor substantially all of those ingredients therein which boil below the boiling point of water, said evaporation being effected at a low enough temperature and over a short enough period of time not to effect substantial degradation of the polypeptide in the mother liquor, thus yielding an evaporation residue that is suitable for use as a base in preparing acidic, soft drink (e.g. carbonated), protein beverages.

DETAILED DESCRIPTION

As stated above, the process of the present invention provides acidic beverages that are rich in dissolved polypeptides obtained from protein provided by one or more of defatted soya, corn, and cotton seeds. By "defatted", when describing the protein that can be used in the process of this invention, is meant protein materials which are substantially free of fat. Because of its low cost and ready adaptability to the process of the present invention, soya protein is generally preferred, and suitable sources thereof include, for example, soya protein isolate, soya flour, soya grits, soya concentrate, soya meal, and their mixtures. It is also preferred that the protein material be ground, powdered, homogenized, comminuted or otherwise suitably converted to small particle size to permit easy and economical dispersion in water at the desired concentration of use.

In accordance with the process of the present invention, the pre-hydrolysis, denaturation heat treatment is conducted by heating a slurry of the protein, advantageously an aqueous slurry of defatted soya protein, under denaturation conditions including a temperature and residence time sufficient to substantially destroy vegetative cells, and preferably, but not necessarily, to substantially destroy spores as well. Generally, a temperature of at least about 150°F. for a time sufficient to increase the yield of a soluble, nutritional, polypeptide product, which is produced when the preheated product is subsequently subjected to enzymatic hydrolysis, can be used. The preheat treatment is advantageously conducted in a heating zone under pressure conditions sufficient to maintain the integrity of the slurry, i.e., at a substantially constant volume.

The temperatures employed in the denaturation heat treatment generally range from about 150° to 375°F., preferably from about 175° or 200° to 300°F. Residence time employed can generally range from about 0.01 to about 120 seconds or more, preferably from about 0.1 to 40 seconds. Pressure conditions depend upon the temperature employed and can range from atmospheric to super-atmospheric pressure, e.g., from about 0 to 175 psig.

So as to optimize the amount of soluble polypeptides obtained from the hydrolysis treatment, the pre-hydrolysis heat treatment is desirably conducted for a relatively long period of time when the temperature employed is relatively low. Conversely, at relatively high treatment temperatures the duration of the denaturation heat treatment is preferably kept short, so as to avoid imparting a burnt taste to the product or substantially degrading the protein.

No adjustment of the natural pH of the slurry of the protein is necessary for the denaturation heat treatment in the process of the present invention; accordingly, it will generally have a pH of about 6.0 or 6.5 to 7.0 or 7.5.

The concentration of the edible protein in the slurry is generally in amounts insufficient to deleteriously affect its processing, since too high of a concentration will result in a viscous and difficult-to-handle slurry. Soya protein, for instance, has a tendency to absorb or tie-up water around its molecular structure and thus further thicken a slurry. Generally, when employing soya grits, which normally contain about 50 wt. percent soya protein, the soya grits can be employed in the slurry in a concentration of up to about 16 wt. percent based upon the soya grits and water.

In a particularly advantageous aspect of the present invention, the pre-hydrolysis, denaturation heat treatment can be conducted using soya, preferably in flour or grit form, containing about 40 to 60 wt. percent protein under denaturation temperature and residence time conditions sufficient to provide a nutritional polypeptide product having optimized flavor characteristics as well as being produced in increased yields. In this aspect, the aqueous slurry of defatted soya protein is advantageously heated (a) at a temperature of at least about 200°F., but below a temperature which will deleteriously affect flavor optimization of the soluble polypeptide product produced by subsequent enzymatic hydrolysis, and (b) for a time sufficient to initiate some denaturation, but insufficient to deleteriously affect the flavor optimization of the soluble polypeptide product produced by subsequent enzymatic hydrolysis. Generally, the temperatures for the denaturation treatment, when using soya protein, can range from about 200° to 265°F., preferably from about 215° to 245° or 255°F., and the residence time can often range from about 0.1 to about 30 seconds or more, preferably from about 0.2 to 20 seconds. At higher temperatures, shorter residence times can be used since the desired degree of denaturation can be effected more expeditiously while avoiding the risk of providing a nutritional polypeptide product which is bitter tasting.

In the enzymatic hydrolysis phase, the next phase of the process, any suitable proteolytic enzyme which serves to hydrolyze edible protein may be employed in the process of the present invention. Such proteolytic enzymes from animal, vegetable and microbiological sources are well known to the art and include, for example, protease enzymes such as neutral protease, alkaline protease and mixtures thereof, pepsin, ficin, papain, renin, and the like. Enzymes having activity at a pH from about 6.0 to 14.0 are advantageous. However, because of its efficiency of operation and because of its maximum activity at neutral pH (e.g. 6.0 to 7.5), neutral protease is the preferred enzyme for use in the process of the present invention.

Protease enzymes are typically obtained by cultivating a strain of a protease enzyme-producing microorganism in a nutrient medium. Examples of such microorganisms used in preparation of protease enzymes include protease enzymeproducing microorganisms of the Bacillus, Aspergillus and Streptomyces genera such as, for example, *Bacillus subtilis*, *Aspergillus oryzae* and *Streptomyces griseus*. A particular strain of organism used in the preparation of mixtures of neutral protease and alkaline protease is a mutant strain of *Bacillus subtilis* described in U.S. Pat. No. 3,031,380. A culture of this organism is deposited in the culture collection of the United States Department of Agriculture, Agricultural Research Service, Northern Utilization Division, Peoria, Illinois, and is available to the public. Most protease enzyme-producing microorganisms yield a mixture of neutral protease and alkaline protease. If desired, the enzyme of choice may be separated from the mixture by any suitable procedure such as, for example, by chromatography or ion exchange separation procedures.

In carrying out the enzymatic hydrolysis phase of the process of the present invention, the temperature of the denatured protein product from the pre-hydrolysis heat treatment phase is controlled to provide a product having a temperature suitable for the particular enzyme employed. The "controlling" may or may not involve an actual temperature adjustment, e.g., cooling to a temperature suitable for enzyme action. Advantageously, the enzyme employed is one which will normally permit the utilization of the heat-treated product without further modification.

The concentration of the denatured protein in the slurry to be subjected to enzyme hydrolysis may vary over a wide range and will depend, amont other things, on the particular protein used and the particular enzyme employed. A concentration of protein in the slurry of about 1 to about 15%, based on the total weight of the slurry, is generally suitable.

The pH of the slurry can be adjusted, if necessary, to the pH of maximum activity of the enzyme of choice. For example, when alkaline protease is the enzyme of choice, the pH of the slurry is adjusted upward from neutrality to about 10 using a suitable base, such as sodium hydroxide or potassium hydroxide. When pepsin is the enzyme of choice, the pH of the slurry will be adjusted downward from neutrality to about 2.0 with suitable acid, such as phosphoric acid or hydrochloric acid.

Advantageously, however, neutral protease is employed in the process of the present invention to avoid the necessity for pH adjustment of the protein-containing slurry before the addition of the enzyme as well as during the course of enzymatic action. In this event, moreover, the pH of the slurry becomes acidic (the pH character sought for the ultimate soft drink product). Still another particular advantage of using a neutral enzyme results in the production of a better tasting ultimate product. The amount of enzyme to be added to the slurry will vary, depending, among other things, on the particular enzyme used and its activity, the pH of the slurry, the concentration of protein in the slurry, and the source of the protein. Determination of a suitable amount of enzyme for use in this phase of the process is readily within the skill demanded of the art.

The time required for enzyme treatment of the slurry will also vary depending principally upon the enzyme of choice, the temperature of the slurry and the amount and source of protein in the slurry. Typically, enzyme treatment time in the range of from about ½ to about 24 hours is employed. The temperature of treatment will also vary and will depend principally on the temperature at which the enzyme of choice has optimum activity. In the case of neutral protease, the preferred temperature is in the range of from about 105° to about 140°F. The optimum temperature for suitable enzymes other than neutral protease may be lower or higher and is readily determined by the skilled worker in the known manner. Generally speaking, a temperature in the range of from about 50° to about 160°F. is generally employed. Of course, elevated temperatures which tend to inactivate or denature the enzyme should be avoided.

The enzymatic hydrolysis is advantageously conducted at a temperature and residence time sufficient to hydrolyze a predominant amount of the heat-treated protein, for instance at least 65 wt. percent and preferably at least about 75 wt. percent of the protein. The hydrolysis is, from a flavor optimization standpoint, preferably terminated before it proceeds to the point of producing a significant amount of product(s) in addition to the desirable polypeptides which will cause a bitter taste in the mouth of one consuming a beverage containing such polypeptides. A low odor, bland polypeptide product which can be incorporated into beverages is desirable. The hydrolysis is generally conducted to a point, however, to provide a soluble polypeptide product which will not precipitate at a pH below 4.5.

Advantageously, the enzymatic hydrolysis can be conducted at a temperature in the range of about 105° to 150°F., preferably 120° to 140°F., and a residence time generally from about 30 minutes (m.) to 150 m., preferably 90 m. to 120 m., particularly when using Montase 110 (DA-10), a commercial enzyme mixture described infra.

After the treatment with the enzyme, the pH of the slurry is adjusted to in the range of from about 2.5 to about 6.0. In order to assure tht acidified beverages prepared from the resulting solubilized polypeptide are devoid of undesirable precipitate, however, it is particularly advantageous that the pH of the slurry be adjusted to, or below, that which the acidified beverage will have, i.e. up to about 4.0 or 4.3, e.g. about 3.0 to 4.0 or 4.3. When downward pH adjustment is required, as is the usual case, any acid suitable for food use may be employed. Such acids include phosphoric acid, malic acid, tartaric acid, citric acid, and succinic acid. When the enzymatic hydrolysis is conducted with neutral or alkaline protease such acid treatment can also advantageously serve to inactivate the enzyme. When upward pH adjustment is required, a suitable base for food use such as sodium hydroxide or potassium hydroxide may be employed. The enzyme is preferably inactivated in any event to avoid the production of products having a deleterious affect on the taste of the ultimate product. Thus, if the enzyme is one acting at a pH of 3 to 4.3, for instance, it can be deactivated by heating the slurry to an enzymedeactivating temperature.

The whole slurry resulting from the hydrolytic action of a proteolytic enzyme is, advantageously, first treated to adjust the pH of the slurry before any solids are removed. In following this particular aspect, the solids-removal during the processing can be conducted more efficiently, while at the same time providing a product with the desired taste characteristics. Thus, it is unnecessary in the present process to subject the slurry to more than one solids separation step. This provides an economic advantage over similar processes which effect removal of undissolved solids both before and after lowering the pH of an aqueous, polypeptide-containing liquor which has been enzymatically hydrolyzed.

After pH adjustment, any undissolved solids that are present in the dissolved polypeptide-containing product are removed, as, for example, by centrifugation, filtration, or decantation.

The removal of undissolved solids from the acidified slurry is advantageously conducted while the slurry is at a temperature of about 50°F. or lower, e.g. at or below about 40°F. By cooling the slurry to these relatively low temperatures before filtering or otherwise treating the slurry to separate undissolved solids from mother liquor, a small amount of the dissolved protein comes out of the solution by cryo-precipitation and is admixed with the other undissolved solids. This precipitate is subsequently separated from the mother liquor along with the rest of the undissolved solids. Clear beverages forward from the resultant mother liquor are less susceptible, then, to becoming cloudy in appearance — due to cryo-precipitation — when they are chilled, e.g. by the consumer.

The separated mother liquor, i.e., the acidic, aqueous solution of polypeptides, is treated so as to evaporate therefrom substantially all of those ingredients therein which boil below the boiling point of water. The chemical identity of these "low-boiling ingredients," as they will hereinafter be called, is unknown, but they are present in the acidified, polypeptide solution in at least trace amounts, generally no more than 1 weight percent of the solution. This evaporation step has been found to remove off-flavor components of the polypeptide-containing product and provide for a final beverage having improved taste.

Evaporation of the low boiling ingredients from the polypeptide solution can be accomplished concurrently with the evaporation of water from the solution, and it is preferred that prior to this evaporation step the solution have a solids content of about 4 to 8 weight percent. The evaporation of water can be total, if desired, but it is frequently preferred, for economic reasons, not to continue such evaporation beyond the point where the solids content of the remaining liquid has reached about 80 weight percent. A residual liquor having a solids content of about 40 to 65 weight percent is often preferred. If, however, a completely dried product is desired — say for ease an economy of its transportation — then it is usually preferred to first evaporate enough of the water (together, of course, with the low boiling ingredients) to attain a solids content of about 20 to 40 weight percent in the residue, and then subject that residue to spray drying.

As hereinbefore stated, the evaporation step is to be effected under mild enough conditions that no substantial degradation of the polypeptide in the product results. Such degradation will generally not occur at temperatures of about 160°F. or lower, so that the evaporation can, if desired, usually be effected by boiling the polypeptide solution at such a temperature, e.g. at about 70° to 160°F., most preferably about 85° to 125°F., for instance with the aid of a vacuum pump to establish a sub-atmospheric pressure over the solution.

Alternatively, the evaporation can be effected by first heating the solution and then subjecting the heated solution to flash distillation, for example under a pressure of about 15 to 30, preferably about 20 to 25, inches of mercury. The pre-heating should be at least to a temperature at which water will evaporate under the pressure maintained in the flash distillation zone; preferably, however, the solution will not be pre-heated to more than about 375°F. Most often, a pre-heat to about 120° to 250°F. will be used. The flash distillation technique can involve the use of temperatures that are high enough, were the polypeptide maintained at that temperature for a sufficient length of time, to degrade the polypeptide. Accordingly, since such degradation is to be avoided, when degrading temperatures are going to be reached in the pre-heating step such heating should be effected over a relatively short period of time — short enough that no substantial degradation of the dissolved polypeptide occurs. As an example, if the flash distillation technique to be employed involves heating the polypeptide solution to, say, about 230°F. before releasing the solution to the lower pressure distillation zone, then the solution would preferably be heated from ambient to about 230°F. within about 10 minutes, most preferably within about 60 seconds.

A useful apparatus for effecting quick heating of polypeptide solution that is to be flash distilled is that described in U.S. Pat. No. 3,101,284 to Etheridge. This apparatus mixes steam under superatmospheric pressure with the liquid to be heated in the throat of a steam jet. Using this apparatus, the heating of the solution from ambient temperature to the desired flash distillation temperature can be accomplished almost instantaneously. Use of this type of apparatus may effect removal of the low boiling ingredients without changing the overall solids content of the polypeptide solution. This would be the case where the amount of steam added to pre-heat the solution is equivalent to the amount of vapor that is removed in the distillation zone.

After the evaporation and removal of the low boiling ingredients, the polypeptide-containing residue may then be formulated into an acidic, carbonated beverage in the known manner, as, for example, by adding back any evaporated water that might be required, and by addition of a flavoring component such as orange, cola, grape, vanilla, fruit or root beer flavoring additives, vitamins and minerals, coloring and preservative, and carbonation. The beverage can be used immediately, or it can be packaged, as by bottling or canning, for future use.

The invention will be understood more fully by reference to the following specific examples. It is understood that the examples ar presented for the purpose of illustration only and are not intended as limitations of the invention.

EXAMPLE I

An aqueous slurry of soya grits (30 kilograms having a soya grit concentration of 6.25 weight percent) is prepared using Soyabits 20 AW, which are defatted soya grits containing about 50 wt. percent protein, of which about 55 to 70% is water-soluble, and which are commercially available from Central Soya of Chicago, Ill. To this slurry is added 12 ppm of F2 antifoam, a food grade silicone obtained from Hodag Chemical Corp. The slurry is then heated at a temperature of 225°F. for 5 seconds by conducting it through a heat exchanger which contains a coil of tubing in a constant temperature environment, although other indirect heaters or direct steam injection can also be used to achieve the same conditions.

The heat-treated, aqueous slurry is rapidly cooled to 130°F., and Montase 110, a commercial mixture of neutral protease, alkaline protease and amylase, is added. This enzyme mixture can be provided by fermentation with *Bacillus subtilis* strain NRRL-B-3411 and typically contain (recovered solids) in the range of from about 700,000 to 2,000,000 units of neutral protease activity, about 200,000 to 500,000 units of alkaline protease activity, and about 300,000 to 500,000 units of amylase activity. Montase 110 is added in powder form in an amount equivalent to 1 wt. percent of the amount of protein present in the slurry. The resulting mixture is stirred for approximately 105 minutes, during which period the temperature is maintained at approximately 130°F. On completion of the 105-minute period, the temperature is lowered to 77°F., and the pH of the slurry is lowered to 3.5 by addition of 85% aqueous phosphoric acid (277 grams). A solid material precipitates from the acidified slurry. The precipitated material is then separated from the mother liquor by centrifugation. About 27 kilograms of a clear, acidified solution, rich in nutritional polypeptides, is obtained.

The 27 kilograms of mother liquor is placed in a 10 gallon, stainless steel milk can. The solution is sucked at a rate of about one-fourth kilogram per minute through a tube into a vacuum distillation unit equipped with a condenser. The temperature of the solution in the unit is maintained at about 100°F. under a vacuum of 27 to 30 inches of mercury. About 80 weight percent of the solution is evaporated over an approximately 2 hour period, leaving a brown residue having a viscous consistency like tht of molasses and a solids content of about 50 weight percent, of which polypeptides constitute about 50 weight percent.

To formulate the residual product into a beverage, the product is first diluted with water to a polypeptide content of about 2.4 weight percent, and then 4055 grams of the diluted solution is mixed with 720 grams of aqueous sucrose solution (60 weight percent concentration), sodium benzoate (4.78 grams), lemon and lime oils (5.0 grams) FD and C yellow No. 5 coloring (0.01 gram) and a mixture of vitamin A, $B_1$, $B_2$, $B_6$, $B_{12}$, D and niacin in a lactose carrier (1.2 grams). The resulting clear solution is then passed through a carbonator to dissolve therein 2.5 times its volume of gaseous carbon dioxide. The resulting carbonated beverage has no bitter or beany taste, nor does it have a gritty, or otherwise unpleasant, mouth feel.

EXAMPLE II

The procedure of Example I is repeated, but using flash distillation rather than heating under a partial vacuum. The mother liquor is heated with a steam jet to about 230°F. using the apparatus described in U.S. Pat. No. 3,101,284. The heated solution is then released to a vacuum chamber maintained at a vacuum of about 22 inches of mercury. The evaporized material, which is mostly water but contains substantially all of the low boiling ingredients of the mother liquor, is removed from the chamber and condensed. The residual liquor has a solids content of about 6 weight percent and is formulated into a beverage in the manner of Example I.

EXAMPLE III

Example II is repeated in every detail, except that the temperature of the slurry after conclusion of the enzymatic hydrolysis is lowered to about 40°, rather than 77°F., prior to separation of precipitated material. This procedure advantageously prevents cryo-precipitation in the finished beverage.

EXAMPLE IV

Example I is repeated in every detail, except that the initial soya protein slurry is an aqueous slurry of soya protein isolate (30 kilograms having a soya protein isolate concentration of 3.0 weight percent) which is prepared using Promine D, a protein isolate from soya containing about 90 weight percent protein, of which about 75% is water soluble, and which is commercially available from Central Soya.

EXAMPLE V

Essentially the same procedure employed in Example I is followed except cotton seed is used instead of soya.

EXAMPLE VI

Essentially the same procedure employed in Example I is followed except corn seed is used instead of soya.

Various modifications and equivalents will be apparent to one skilled in the art and may be made in the process of the present invention without departing from the spirit or scope thereof and it is, therefore, to be understood that the invention is to be limited only by the scope of the appended claims.

We claim:
1. In the preparation of an acid-soluble polypeptide product for use as a base in preparing acidic, soft drink, protein beverages, by a process comprising the steps of
  1. heating an aqueous slurry of defatted protein derived from soya, cotton or corn seeds, under substantially neutral pH conditions, at a temperature of about 150° to 375°F. for a time sufficient to increase the yield of a soluble, nutritional, polypeptide product which is produced when the heated slurry is subsequently subjected to enzymatic hydrolysis, but insufficient to deleteriously affect the flavor of said polypeptide product,
  2. controlling the temperature of the heat-treated slurry to provide temperature conditions suitable for enzymatic hydrolysis,
  3. subjecting the resulting slurry to enzymatic hydrolysis conditions, including the action of a proteolytic enzyme, to hydrolyze a predominant amount of heat-treated protein and produce water-soluble polypeptides,
  4. adjusting the pH of the resulting slurry to about 3.0 to 4.3 and inactivating the enzymes, and
  5. removing undissolved solids from the slurry to leave an acidic mother liquor containing dissolved polypeptides; the improvement comprising
  6. evaporating from said mother liquor having a pH from about 3.0 to 4.3 substantially all of those off-flavor ingredients in the polypeptide-containing product which boil below the boiling point of water, said evaporation being effected at a temperature sufficient to separate the ingredients from the mother liquor and over a period of time sufficient to evaporate the ingredients but insufficient to effect substantial degradation of the polypeptide in the mother liquor, thus yielding a residue that is suitable for use as a base in preparing acidic, soft drink, protein beverages.

2. In the preparation of an acid-soluble polypeptide product for use as a base in preparing acidic, soft drink, protein beverages, by a process comprising the steps of
  1. heating an aqueous slurry of defatted protein derived from soya, cotton or corn seeds, under substantially netural pH conditions, at a temperature of about 150° to 375°F. for a time sufficient to increase the yield of a soluble, nutritional, polypeptide product which is produced when the heated slurry is subsequently subjected to enzymatic hydrolysis, but insufficient to deleteriously affect the flavor of said polypeptide product,
  2. controlling the temperature of the heattreated slurry to provide temperature conditions suitable for enzymatic hydrolysis,
  3. subjecting the resulting slurry to enzymatic hydrolysis conditions, including the action of a proteolytic enzyme having activity at a pH from about 6.0 to 14.0, to hydrolyze a predominant amount of heat-treated protein and produce water-soluble polypeptides,
  4. adjusting the pH of the resulting slurry to about 3.0 to 4.3 to provide acidic conditions comparable to the pH desired for the protein beverage and to inactivate the enzyme, and
  5. removing undissolved solids from the slurry to leave an acidic mother liquor containing dissolved polypeptides; the improvement comprising
  6. evaporating from said mother liquor having a pH from about 3.0 to 4.3 substantially all of those off-flavor ingredients in the polypeptide-containing product which boil below the boiling point of water, said evaporation being effected at a temperature sufficient to separate the ingredients from the mother liquor and over a period of time sufficient to evaporate the ingredients but insufficient to effect substantial degradation of the polypeptide in the mother liquor, thus yielding a residue that is suitable for use as a base in preparing acidic, soft drink, protein beverages.

11

3. The process of claim 2 wherein a proteolytic enzyme employed in step (3) is one having activity at a pH from about 6.0 to 7.5.

4. The process of claim 3 wherein the enzyme is a mixture of neutral protease and alkaline protease.

5. The process of claim 2 wherein the step (6) evaporation is performed by boiling the mother liquor at a temperature of about 70° to 160°F.

6. The process of claim 5 wherein the step (1) heating is conducted for about 0.01 to 120 seconds.

7. The process of claim 5 wherein the residue from the step (6) evaporation is a polypeptide solution having a solids content of about 40 to 65 weight percent.

8. The process of claim 2 wherein the step (6) evaporation is performed by boiling the mother liquor at a temperature of about 85° to 125°F.

9. The process of claim 2 wherein the step (6) evaporation is performed by heating the mother liquor to a temperature of about 120° to 250°F. and then subjecting the heated mother liquor to flash distillation, thereby effecting evaporation of said off-flavor ingredients.

10. The process of claim 2 wherein the protein used is defatted soya protein.

11. The process of claim 10 wherein the protein is supplied by soya flour, soya grits or soya protein isolate.

12. The process of claim 9 wherein the protein is supplied by soya protein isolate.

13. The process of claim 2 wherein the acidified slurry is at a temperature of about 50°F. or lower when the undissolved solids are removed from it in step (5) to leave a mother liquor containing dissolved polypeptides.

14. The process of claim 13 wherein the step (3) hydrolysis is conducted at about 105° to 150°F. for a residence time of about 30 to 150 minutes.

15. The process of claim 2 wherein the step (1) heating is conducted for about 0.01 to 120 seconds.

16. The process of claim 15 wherein the step (3) hydrolysis is conducted at about 105° to 150°F. for a residence time of about 30 to 150 minutes.

17. The process of claim 2 wherein the residue from step (6) evaporation is a polypeptide solution having a solids content of about 40 to 65 weight percent.

18. In the preparation of an acidic, carbonated, protein beverage by a process comprising the steps of
1. heating an aqueous slurry of defatted protein derived from soya, cotton or corn seeds under substantially neutral pH conditions at a temperature of about 150° to 375°F. for a time sufficient to increase the yield of a soluble, nutritional, polypeptide product which is produced when the heated slurry is subsequently subjected to enzymatic hydrolysis, but insufficient to deleteriously affect the flavor of said polypeptide product,
2. controlling the temperature of the heattreated slurry to provide a slurry having a temperature from about 105° to about 140°F. for enzymatic hydrolysis,
3. subjecting the resulting slurry to enzymatic hydrolysis conditions, including the action of a proteolytic enzyme having activity at a pH from about 6.0 to 7.5, to hydrolyze at least 65 wt. percent of the protein and produce water-soluble polypeptides,
4. adjusting the pH of the resulting slurry to about 3.0 to 4.3 to provide acidic conditions comparable to

12 the pH desired for the protein beverage and to inactivate the enzyme, and
5. removing undissolved solids from the slurry to leave an acidic mother liquor containing dissolved polypeptides; the improvement comprising
6. evaporating from said mother liquor having a pH from about 3.0 to 4.3 substantially all of those off-flavor ingredients in the polypeptide-containing product which boil below the boiling point of water, said evaporation being effected at a temperature sufficient to separate the ingredients from the mother liquor and over a period of time sufficient to evaporate the ingredients but insufficient to effect substantial degradation of the polypeptide in the mother liquor, and
7. formulating the evaporation residue into an acidic, carbonated beverage.

19. The process of claim 18 wherein the step (6) evaporation is performed by boiling the mother liquor at a temperature of about 70° to 160°F.

20. The process of claim 18 wherein the step (6) evaporation is performed by boiling the mother liquor at a temperature of about 85° to 125°F.

21. The process of claim 18 wherein the step (6) evaporation is performed by heating the mother liquor to a temperature of about 120° to 250°F. and then subjecting the heated mother liquor to flash distillation, thereby effecting evaporation of said ingredients.

22. The process of claim 18 wherein the protein used is defatted soya protein.

23. The process of claim 22 wherein the protein is supplied by soya flour, soya grits or soya protein isolate.

24. The process of claim 23 wherein the protein is supplied by soya protein isolate.

25. The process of claim 23 wherein the enzyme used in step (2) is neutral protease and the pH of the slurry is adjusted in step (4) to within the range of 3.0 to 4.0.

26. The process of claim 23 wherein the acidified slurry is at a temperature of about 50°F. or lower when the undissolved solids are removed from it in step (5) to leave a mother liquor containing dissolved polypeptides.

27. In the preparation of an acidic, carbonated, protein beverage from an aqueous slurry of defatted soya protein, by a process comprising the steps of
1. heating an aqueous slurry of defatted soya protein in the form of flour or grits under substantially neutral pH conditions at a temperature of about 150° to 375°F. for about 0.01 to 120 seconds,
2. controlling the temperature of the heattreated slurry to provide a slurry having a temperature from about 105° to about 140°F. for enzymatic hydrolysis,
3. subjecting the resulting slurry to enzymatic hydrolysis conditions, including the action of neutral protease at a temperature of about 105° to 150°F. for a residence time of about 30 to 150 minutes, to produce water-soluble polypeptides,
4. adjusting the pH of the resulting slurry to about 3.0 to 4.0 to provide acidic conditions comparable to the pH desired for the protein beverage and to inactivate the enzyme, and
5. removing undissolved solids from the slurry to leave an acidic, polypeptide-containing mother liquor containing about 4 to 8 weight percent of dissolved solids; the improvement comprising 6. evaporating from said mother liquor having a pH from about 3.0 to 4.0 substantially all of those off-flavor ingredients in the polypeptide product which boil below the boiling point of water, said evaporation being effected at a temperature sufficient to separate the ingredients from the mother liquor and over a period of time sufficient to evaporate the ingredients but insufficient to effect substantial degradation of the polypeptide matter in the mother liquor, and 7. formulating the evaporation residue into an acidic, carbonated beverage.

28. The process of claim 27 wherein the step (6) evaporation is effected by boiling the mother liquor at a temperature of about 85° to 125°F. to raise the solids content of the liquor to about 40 to 65 weight percent.

29. The process of claim 27 wherein the step (6) evaporation is effected by heating the mother liquor to a temperature of about 120° to 250°F. and then subjecting the heated mother liquor to flash distillation.

30. The process of claim 27 wherein the step (1) heating is conducted at a temperature of about 215° to 255°F. for about 0.2 to 20 seconds.

* * * * *

UNITED STATES PATENT OFFICE
CERTIFICATE OF CORRECTION

PATENT NO. : 3,876,806
DATED : April 8, 1975
INVENTOR(S) : Walter L. Hempenius and Keith L. Chandler It is certified that error appears in the above-identified patent and that said Letters Patent are hereby corrected as shown below.

Column 6, line 45, "forward" should read --formed--.

Claim 12, line 1, "9" should read --11--.

Signed and sealed this 17th day of June 1975.

(SEAL)
Attest:

RUTH C. MASON
Attesting Officer

C. MARSHALL DANN
Commissioner of Patents
and Trademarks